United States Patent
Chakravorty et al.

(10) Patent No.: US 7,139,372 B2
(45) Date of Patent: Nov. 21, 2006

(54) AUTHORIZED DISTRIBUTION OF DIGITAL CONTENT OVER MOBILE NETWORKS

(75) Inventors: Jyotirmoy Chakravorty, Bangalore (IN); Rajesh T. S. Reddy, Bangalore (IN)

(73) Assignee: July Systems, Inc, Santa Clara, CA (US)

( * ) Notice: Subject to any disclaimer, the term of this patent is extended or adjusted under 35 U.S.C. 154(b) by 234 days.

(21) Appl. No.: 10/383,374

(22) Filed: Mar. 7, 2003

(65) Prior Publication Data

US 2004/0176080 A1    Sep. 9, 2004

(51) Int. Cl.
*H04M 15/00* (2006.01)
*H04M 3/42* (2006.01)
*G06F 17/30* (2006.01)

(52) U.S. Cl. ............... 379/114.01; 705/27; 705/26; 455/414.1

(58) Field of Classification Search ............ 379/93.01, 379/93.02; 455/412.1, 412.2, 414.1, 418, 455/420, 158.5, 566; 709/217, 219, 231; 713/200
See application file for complete search history.

(56) References Cited

U.S. PATENT DOCUMENTS

| 5,594,779 | A  | * | 1/1997  | Goodman ............... 455/3.04 |
| 6,421,707 | B1 | * | 7/2002  | Miller et al. ........... 709/206 |
| 6,507,727 | B1 | * | 1/2003  | Henrick ............... 455/3.06 |
| 6,557,054 | B1 | * | 4/2003  | Reisman ............... 710/33 |
| 6,804,517 | B1 | * | 10/2004 | Laurila ............... 455/435.1 |
| 2002/0065732 | A1 | * | 5/2002 | Rodgers et al. ........ 705/26 |
| 2002/0069282 | A1 | * | 6/2002 | Reisman ............... 709/227 |
| 2002/0116478 | A1 | * | 8/2002 | Paradinas et al. ...... 709/220 |
| 2002/0156691 | A1 | * | 10/2002 | Hughes et al. ......... 705/26 |
| 2002/0178271 | A1 | * | 11/2002 | Graham et al. ......... 709/229 |
| 2003/0018816 | A1 | * | 1/2003 | Godfrey et al. ........ 709/246 |
| 2003/0093476 | A1 | * | 5/2003 | Syed ................. 709/204 |
| 2003/0226012 | A1 | * | 12/2003 | Asokan et al. ......... 713/156 |
| 2004/0152454 | A1 | * | 8/2004 | Kauppinen ........... 455/414.3 |
| 2004/0158741 | A1 | * | 8/2004 | Schneider ........... 713/201 |
| 2004/0171378 | A1 | * | 9/2004 | Rautila ............. 455/419 |
| 2004/0176080 | A1 | * | 9/2004 | Chakravorty et al. ... 455/414.1 |
| 2004/0198308 | A1 | * | 10/2004 | Hurst et al. ......... 455/403 |
| 2004/0249768 | A1 | * | 12/2004 | Kontio et al. ........ 705/65 |
| 2005/0004875 | A1 | * | 1/2005 | Kontio et al. ........ 705/52 |

FOREIGN PATENT DOCUMENTS

WO    WO 2003/005145 A2 *  1/2003
WO    WO 2004/017664 A  *  2/2004

* cited by examiner

*Primary Examiner*—Fan Tsang
*Assistant Examiner*—Joseph T Phan
(74) *Attorney, Agent, or Firm*—William L. Botjer

(57) ABSTRACT

The present invention discloses a method and apparatus for authorized distribution of digital content amongst a plurality of mobile devices, under the mobile service provider's control. A mobile subscriber requests for services (digital content/applications) to a mobile service provider. The mobile service provider then sends a download descriptor to the mobile device through an SMS message. The download descriptor includes a link to the actual digital content hosted by a content provider. The user is then able to read, delete, forward the download descriptor to other mobile users or download the content on his/her mobile device at any point of time. The user also gets notified about any changes such as a new service or a version upgrade according to his/her preferences. The invention enables the mobile service provider to implement payment, licensing, copyright and other digital rights management policies while enabling a user to distribute the content to other users.

7 Claims, 4 Drawing Sheets

AUTHORIZED DISTRIBUTION OF DIGITAL CONTENT OVER MOBILE NETWORKS

BACKGROUND

The present invention relates to distribution of digital content over mobile devices. In particular, this invention relates to distribution and management of digital data and applications over SIM-enabled mobile devices.

Over the past few years, the exchange of digital content over different types of networks in general, and the Internet in particular, has increased enormously. One of the prime reasons for this stupendous increase is the evolution of the Internet as an efficient medium of distribution and management of digital content.

Coupled with the increase in distribution of the digital content is the problem of unauthorized access to the digital content. The ideal way of distribution of digital content is as follows: the digital content is directly sourced from a network (such as a server on the Internet), and is distributed to authorized users through a user device (such as a desktop PC). However, with the ever-increasing amount of digital content distribution over a network, the chances of "unprotected" digital content on the network being easily and freely copied, altered or distributed in large numbers, is turning out to be a grave reality. Needless to say, such unauthorized use of digital content is a big deterrent to the providers of digital content from providing the digital content.

The issue of unauthorized distribution of digital content over the Internet is addressed by proper licensing of the contents through Digital Rights Management (DRM). Digital Rights Management relates to techniques, processes, procedures and algorithms that establish a secure computing environment, and provide a secure infrastructure for the preparation, transmission, and prevention of misuse and/or consumption of protected digital contents.

With rapid developments in wireless technologies and with the onset of technically superior mobile devices and networks, distribution of digital content, which was predominantly being carried out only on the Internet, is now being done over mobile networks as well. The new-generation mobile devices include mobile phones, Personal Digital Assistant (PDA), Laptops, etc. that are capable of handling digital data, such as ring tones, images, etc., and digital applications such as calendar, games, and the like.

The new-generation mobile networks have a high data-transfer rate and, at the same time, support greater number of mobile users at any point of time. The transfer of digital content over the mobile devices involves data transfer between a content provider and an end user. The content provider provides the digital content (data and applications) to the users through a mobile service provider. Alternatively, the mobile service provider may itself host and provide the content to the subscriber.

The present mobile devices also have the capability to distribute (or forward) the contents to other mobile devices. This allows a mobile device user to potentially distribute "unprotected" downloaded content to numerous other mobile device users. This means that unprotected content, such as games, logos, pictures, music, ring tones etc, can be forwarded to other users if there is no protection for preventing such distribution. Such uncontrolled distribution is not desirable to the content provider (of the "unprotected" content). In order to explain this point more clearly, consider an example of a service provider who provides mobile ring tones for some payments by the user. If the ring tone is "unprotected", then the same may be forwarded to numerous other mobile users who have devices capable of receiving the content. For example, MP3 songs can be circulated and shared with users (mobile subscribers) who own devices with embedded of MP3 players. This is economically undesirable for the content provider. Further, such distribution may also lead to problems of licensing and copyright violations. Indeed, the content providers are wary of such problems and these problems are deterring content providers to host "rich" content for mobile devices without taking necessary steps towards protecting the content.

In order to address the above problems, content providers rely on Mobile Digital Rights Management (MDRM) techniques that protect content, and allow only authorized usage of the content. Mobile DRM provides a secure infrastructure for the preparation, transmission, and prevention of misuse of protected digital contents. Thus, content is available to a user only through the content provider (or the mobile service provider as the case may be). Thus, a user cannot forward the "protected" content to other users. However, in such cases, the knowledge about the availability of content cannot be passed on from one mobile user to another. This, in turn, reduces the number of possible users who may actually pay for the content being hosted by the content provider, but may not know about the availability of such content. This situation is also undesirable for the content providers. It is desirable for content providers that the users also distribute the URL or links of digital content to other users, so that each subsequent user who gets the distributed link may pay appropriately to the content provider for using the content. The concept of super-distribution may be used to achieve the above-mentioned objective.

Super-distribution is the process of distribution of digital content virally (over networks such as the Internet). Super-distribution enables the end-users to share such content with other users thereby increasing the distribution and sales of the content. The concept of super distribution is applicable for any type of digital media, software or applications. This concept is currently being used on the Internet with products like Windows® Media Rights Manager (a product by Microsoft Corp., Redmond, Wash., USA), which allow transfer of digital content while taking care of issues of licensing and copyright protection. The product also enables the setting up of a DRM system as per user preferences.

The application of the concept of super-distribution over mobile networks is highly desirable (especially for the content providers), as this enables sharing of content, which, in turn, increases sales and distribution of the content. The existing state of technology (for mobile networks) works as follows: a user requests for download of digital content from his/her mobile service provider. Downloadable digital content is hosted by a content provider, which is in contact with a mobile service provider. Upon receiving the request, the user is prompted to pay for the content that he/she intends to download. After receiving the necessary payments, the mobile service provider forwards the content (which may have digital rights associated with it) to the user. The user is then able to download the requested content on his/her mobile device.

Another existing state of technology is WAP push technology in which a mobile service provider, in conjunction with a content provider, may send a user a link to content provider. This may be sent according to preferences set by the user. In this technology, a link can be delivered to a user but the link cannot be forwarded to any other mobile device. Thus, the aim of greater circulation of content through the concept of super-distribution is not achieved.

An example of a technology used for distribution on mobile networks is Universal Distribution with Access Control—Media Base (UDAC-MB), which has been developed jointly by Sanyo Electric Co., Ltd. (Japan), Hitachi, Ltd. (Japan) and Fujitsu Ltd. (Japan) supports the copying content protection technology to realize legal copying and legal playback.

As is apparent from the above discussion, there are certain limitations in the existing state of technology. The existing state of technology does not support user-to-user authorized forwarding and distribution of digital content over mobile networks. Also, in existing technologies, the communication between the server and the user (client) is restricted to a particular type of mobile device (of the user). For instance, content developed (by content provider) for mobile handset type A may not be usable on mobile handsets of type B. Thus, the communication has to be customized for different types of mobile devices.

Another desirable feature, which is not provided in existing systems, is that of notification to the mobile user, by the service provider, regarding the change of content. The presence of such functionality will help the user to keep updating the features on the mobile device. Also, the existing state of technology needs to further secure the interests of content providers by minimizing the unauthorized use of digital content. The content provider's interest, in terms of returns (payments, licensing fees, etc.) for the provision of content, must be safeguarded against any unauthorized access.

Hence, there is a need for a system for data distribution over a mobile network that allows for authorized forwarding and distribution of URL or link from one mobile user to another. This system must also be able to safeguard the rights of the content providers during the process of forwarding and downloading of the content. Further, a platform independent communication system is required. It is also desirable that a user of a mobile device has an easy and ready access to the downloadable digital content of his/her interest. Additionally, there is a need for an updating feature that will periodically provide information to the mobile users regarding the updates in the contents available for downloading.

SUMMARY

The present invention is directed towards distribution and management of digital data and applications over SIM-enabled mobile devices.

An object of the invention is to provide a system and method for a mobile user to obtain the links for download of digital content through a mobile service provider and store the links in a virtual vault in a protocol-independent way.

Another object of the invention is to provide a system and method for downloading the contents using the links provided through a download descriptor.

Another object of the invention is to allow the forwarding of links by one mobile user to another mobile user through a download server.

Yet another object of the invention is to provide licensing and copyright options for download of contents through the download server in order to prevent piracy.

Yet another object of the invention is to provide payment options for download of contents through the download server in order to enable the mobile service provider to monetize content.

A further object of the invention is to update a mobile user regarding updates in the content provided by a content provider.

A further object of the invention is to enable the download server to seamlessly update the virtual vault, in case of version change (change in available content) or withdrawal of a service.

In order to attain the above-mentioned objectives, the first step is for the mobile user to send a request for services (such as download of digital content) to a mobile service provider. The mobile service provider also checks for the preferences of the mobile user. Further, the mobile service provider sends a download descriptor to the mobile user. The download descriptor contains the details regarding the content that can be downloaded.

The download descriptor is sent to the mobile user using messaging services such as SMS. The download descriptor is stored on the SIM database using a virtual vault on the mobile device in a protocol independent way. The virtual vault is created on the SIM card of the mobile device by the SIM application toolkit. The virtual vault is the "personal repository of descriptors of the applications downloaded". The download descriptor can be invoked at any point of time for the actual download, reading of the content, forwarding the descriptor to other mobile users and deletion of the same.

Downloading of the content is allowed only through licensing and payment. The download server prompts the subscriber for the payment of the requested content, which also handles the associated licensing fee for the content. The download server intermediates in the payment and licensing as per the agreement between the mobile service provider and the content provider.

The invocation of forwarding leads to a message from mobile user to the download server. The message indicates the identification number of the addressed mobile user and the download information contained in the download descriptor. The download server checks the preferences of the addressed mobile user and allows forwarding if the preferences allow for such forwarding. There is also a modification prompt that notifies the mobile user when the download descriptor is changed. Also, the mobile user is notified by the mobile service provider regarding the changes in content provided by the content provider. As a result, the download descriptor stored in SIM database using virtual vault gets updated.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention discloses a system and method for distribution and management of digital content (includes any digital data and applications), which is being distributed amongst SIM-enabled mobile devices over a mobile network. SIM is an acronym for Subscriber Identification Module. SIM cards are small cards that fit inside phones based on GSM technology. When in use, these cards contain personalized information about user and the corresponding mobile service provider. This information includes user's telephone number, phonebook, etc. Any device that uses a SIM card to connect to a mobile network is referred to as a SIM-enabled device. SIM-enabled mobile devices include laptops, Personal Digital Assistants (PDAs), mobile phones, smart phones etc. The present invention enables the implementation of Digital Rights Management (DRM) on the distributed digital content thereby minimizing the unauthorized access to the digital content. Moreover, the present invention enables mobile users to easily and readily access downloadable contents of their choice. The present invention also enables immediate relevant notifications to mobile users as and when there is an update in the content being provided to the users.

Figure 1:
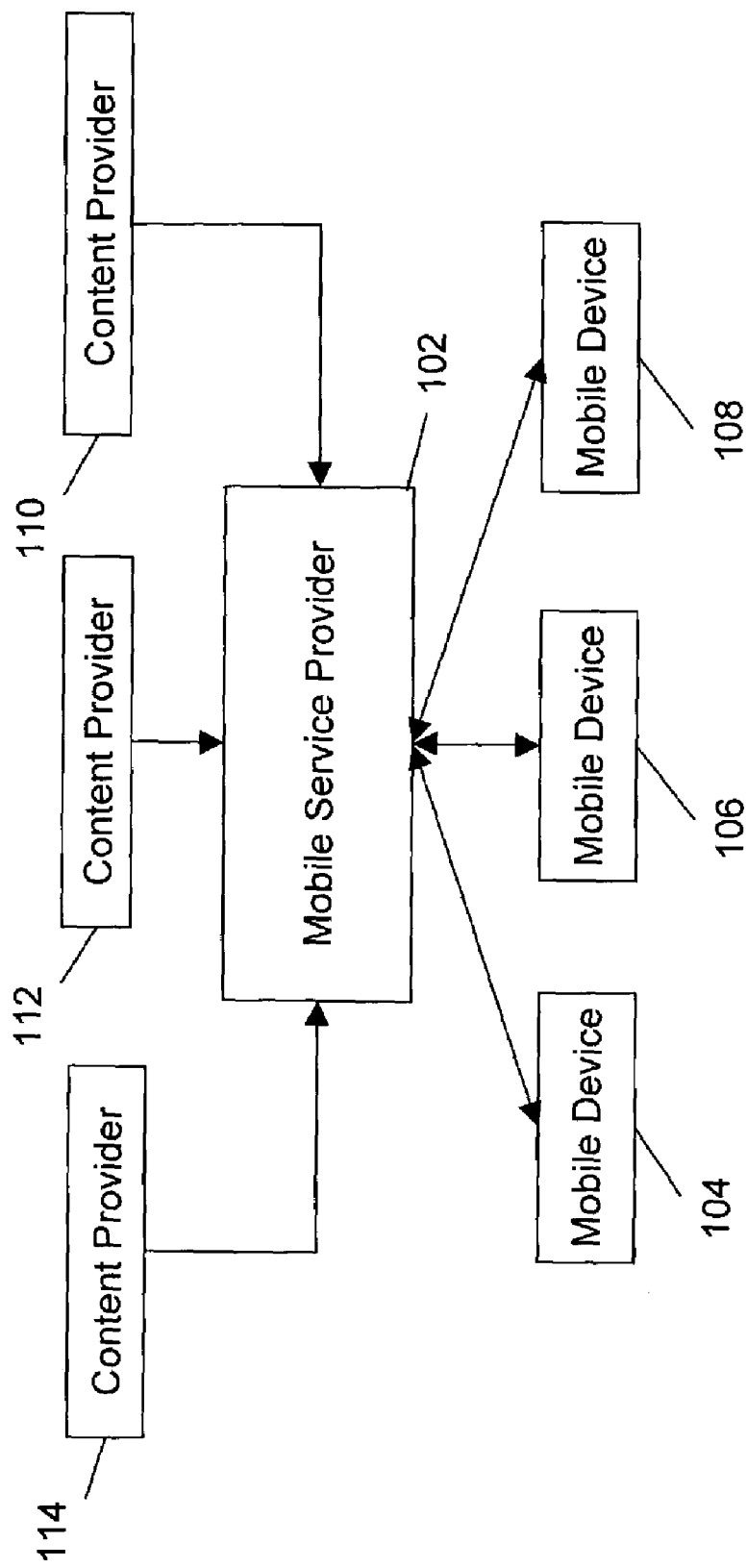
FIG. 1 shows a block schematic of a system for distribution and management of digital content over mobile devices in accordance with a preferred embodiment of the present invention.

FIG. 1 shows a block schematic of a system for distribution and management of digital data and applications over SIM-enabled mobile devices in accordance with a preferred embodiment of the present invention. The setup shows a mobile service provider 102, a plurality of mobile devices 104, 106, 108 that are used by mobile users and a plurality of content providers 110, 112, 114. Content providers 110, 112 and 114 submit content to mobile service provider 102 that can be downloaded to mobile devices 104, 106 and 108. For instance, content provider 110 may provide MP3 songs in the form of digital content. Mobile users can download the MP3 songs to their respective mobile devices through mobile service provider 102. Alternatively, mobile service provider 102 may provide the content directly, and in such cases there is no need for content providers 110, 112 and 114 in the system.

In order to enable the SIM-enabled mobile devices to use (or execute) the downloaded digital data and applications, the SIM-enabled mobile device is provided with a SIM application toolkit. In a preferred embodiment, this SIM application toolkit is "pre-burnt") on permanent memory (ROM) of the SIM of the mobile device before it can be used by the mobile user for download of digital content. GSM 11.14 specification of the SIM Application Toolkit for the Subscriber Identity is well known in the art, and is described in greater detail in conjunction with FIG. 4.

Figure 2:
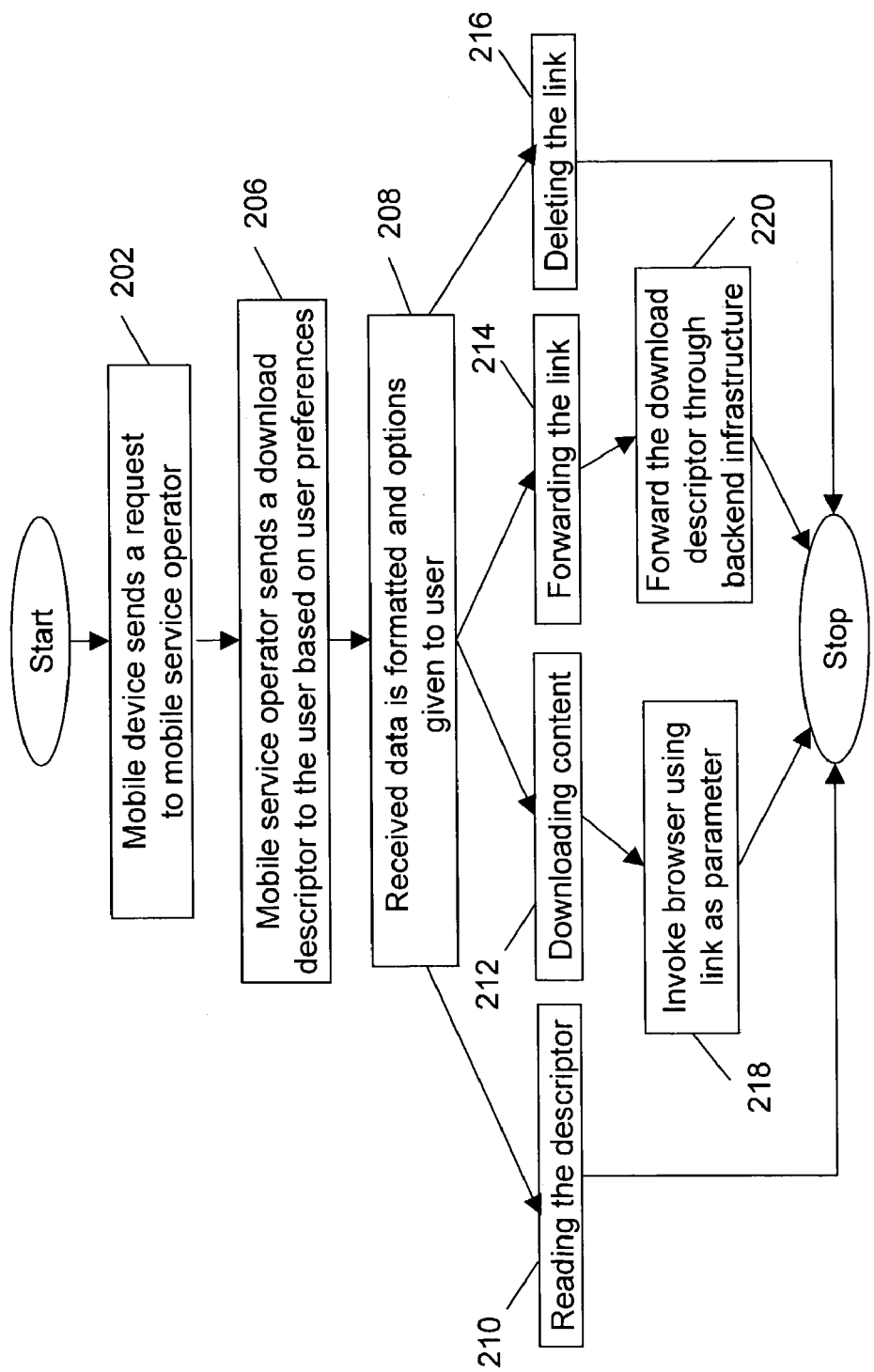
FIG. 2 illustrates a flow chart depicting the method of distribution and management of digital content over mobile devices in accordance with a preferred embodiment of the present invention.

FIG. 2 illustrates a flow chart depicting the method of distribution and management of digital data and applications over SIM-enabled mobile devices in accordance with a preferred embodiment of the present invention. At step 202, a mobile user using his/her mobile device (say mobile device 104) makes a request for service to mobile service provider 102. The request for service to mobile service provider 102 is made for providing services such as downloading of digital content. Downloaded contents include various data and applications such as scheduler, time manager, calculator, dictionary, games, images etc. One instance of such a request for service may relate to downloading of a particular MP3 song. Mobile service provider 102 responds by checking the settings and preferences of the mobile device of the mobile user. These settings and preferences of the mobile device and the mobile user are stored in a repository of mobile service provider 102. The repository of mobile service provider 102 is explained in greater detail in conjunction with FIG. 3. An example of one setting for a mobile device user may be that he/she intends to receive only MP3 songs of a particular artist or genre. The subscriber defines his preferences at the time of being activated for the service. These preferences can be modified later at any time.

At step 206, based on the services subscribed to by the user and by the preferences of the user, mobile service provider 102 sends a download descriptor to the mobile user. A download descriptor contains, among other information, a link or a URL from which the requested digital content can be downloaded. The download descriptor is described later in greater detail in conjunction with FIG. 3. In case a mobile user has previously received the download descriptor and there is an update, the updated download descriptor is sent to the user. Such an updated download descriptor may have one or more updated information fields. Whenever the operator introduces a new service, it is notified to the user based on his/her preferences through SMS containing the relevant download descriptor. The user may also specifically ask for new services.

In a preferred embodiment, the digital content is stored on the servers of content providers 110, 112 or 114. Alternatively, the content may also be stored on the server of mobile service provider 102. The download descriptor may then be sent by mobile service provider 102 to the mobile user using a messaging service such as Short Messaging Service (SMS).

At step 208, the download descriptor, so received, is converted into a format that can be read by mobile devices 104, 106 and 108. The format of download descriptor is described later in the description in conjunction with FIG. 4. In a preferred embodiment, the download descriptor is stored on "virtual vaults" on the SIM card of the mobile device. These "virtual vaults" are storage spaces (memory) on the SIM card that are created by SIM application toolkit in order to "vault" (store) download descriptors. Pointers to download descriptors are stored in SIM application toolkit. Download descriptor can be invoked at any point of time for the purpose of reading as shown in step 210, downloading as shown in step 212, forwarding as shown in step 214, or deleting the link as shown in step 216. In case the mobile user opts to download the content, the mobile user can download the content by invoking a browser as shown by step 218. The actual download gets initiated when the pointers to downloads are activated by the user. This activation may be done by various means, such as clicking the pointer. The browser invoked at this point can be any browser known in the prior art. For example, Wireless Application Protocol (WAP) phones have an in-built microbrowser; Pocket PC 2002 has Pocket Internet Explorer (IE) inbuilt into its Operating System (OS) and SIM Application Toolkit has the logic that launches the appropriate browser based on whether the device is WAP or HTML based. After the browser is invoked, the actual download of the digital content starts and the download is stored in a J2ME application space in the phone memory. Once a digital data or an application is downloaded, the user is prompted if he/she wants to delete the link from the "virtual vault".

The mobile user can also forward the download descriptor to a second user. This is done via a download server 302 provided by the mobile service provider 102 as indicated in step 220. Download server 302 is described in greater detail in conjunction with FIG. 3. Mobile service provider 102 preferably checks for the preferences of the second user to determine whether the download descriptor can be forwarded to the second user or not. If the preferences match, then the download descriptor is forwarded to the second user.

Figure 3:
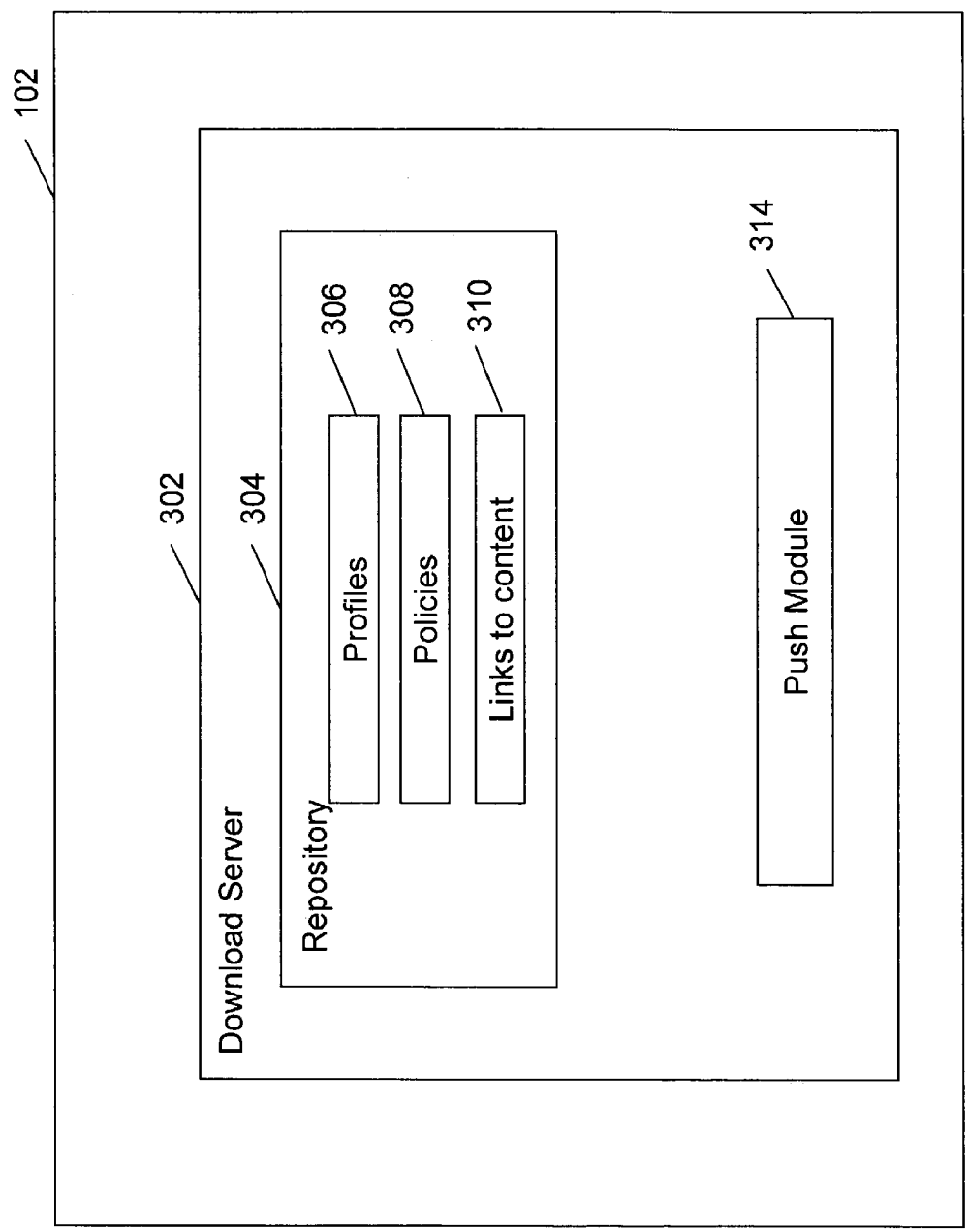
FIG. 3 illustrates the components of mobile service provider in greater detail in accordance with a preferred embodiment of the present invention.

FIG. 3 illustrates the components of mobile service provider 102 in greater detail in accordance with a preferred embodiment of the present invention. Mobile service provider 102 comprises a download server 302 as shown in FIG. 3. Download server 302 includes a repository 304, and a push module 314. Repository 304 preferably includes a profiles repository 306, a policies repository 308 and a "links to content" repository 310. Profiles of mobile users, who use/subscribe to the services of mobile service provider 102, are stored in profile repository 306. Profiles repository 306 includes preferences of the mobile users. The preferences indicate the type of services that are being used by the mobile users. For instance, the preferences may indicate if a mobile user wants to be updated regarding the newer versions of a game is available or if a mobile user wants to be notified for downloads only by friends (predefined mobile users). This data can be stored either in a directory or in a database all of which are known in the art. In a preferred embodiment, this data is stored in a directory using Lightweight Directory Access Protocol (LDAP).

Repository 304 contains the licensing payment policies information in policies repository 308. Mobile service provider 102 and content providers 110, 112 and 114 define the licensing and payment policies. Other policies relating to services, network management, user policies are also stored in policies repository 308.

Repository 304 includes the links or URL of the content providers in the "links to content" repository 308. These links provide the address from which the digital content can be downloaded. Additionally, there is information regarding the title and size of the digital content. The information related to the content gets updated depending on the change in the content.

Download server 302 also includes push module 314. Push module 314 updates the mobile users periodically regarding the change in content. Push module 314 is a messaging module, which sends the download descriptor (to a mobile device) via an SMS. Push module 314 is activated whenever there is a change in content provided by the service provider. It also gets activated if the content provider withdraws the content. Push module 314 updates the links stored in "links to content" repository 310. Push module 314 also updates the mobile users regarding the change in content.

Figure 4:
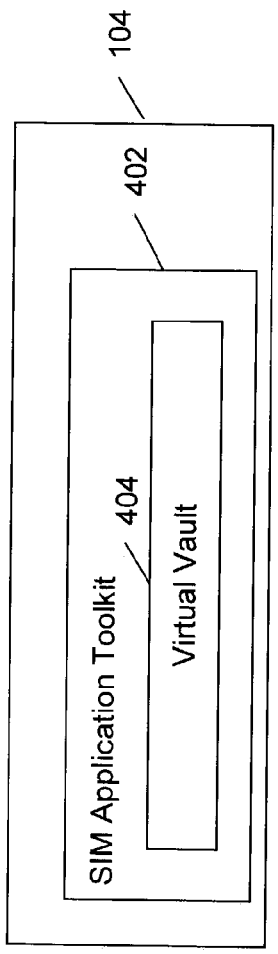
FIG. 4 illustrates the components of mobile device in greater detail in accordance with a preferred embodiment of the present invention.

FIG. 4 illustrates the components of SIM-enabled mobile device in greater detail in accordance with a preferred embodiment of the present invention. Mobile user communicates with mobile service provider 102 through a SIM enabled mobile device. The mobile device can be any SIM-enabled mobile device, such as a mobile phone, PDA etc. A typical SIM enabled mobile device includes a SIM application toolkit 402. As already mentioned, SIM application toolkit 402 is "pre-burnt" on the SIM card of the mobile device before it can be used by a mobile user in order to download digital content. SIM application toolkit 402 provides a standardized execution environment for applications stored on the SIM card. SIM application toolkit 402's specification is an ETSI (European Telecommunications Standards Institute)—SMG (Special Mobile Group). ETSI—SMG is an international standard body that defines specification for SIM application toolkit 402. SIM application toolkit 402 is a platform independent application. This allows client (SIM toolkit application on the SIM) and download server 302 communication through SMS to be independent of the handset and the network. SIM application toolkit 402 receives the download descriptor via messaging services such as GSM SMS. The GSM SMS messages contain User Data Header (UDH) and User Data Fields. UDH is an extension to GSM SMS to allow binary data to precede or replace the text message. The presence of UDH is indicated in the standard SMS header by setting the UDHI (user data header information) field. For instance, there is a chunk header (1 or N) for large SMS messages (beyond 160 characters). UDH and its applications are well known in the art. The download descriptor is received using User Data Header field and is stored on SIM database using a virtual vault 404.

The download descriptor received on a mobile device may include information relating to the name and version of the content, URL from which the content can be downloaded, and the size of the content. The URL is provided in a format that can be read by SIM application toolkit 402. Java Archive (JAR) format is one such format that can be read by SIM application toolkit 402. Download descriptor can be in various formats such as J2ME format. J2ME (Java 2 Platform, Micro Edition is a technology that allows programmers to use the Java programming language and related tools to develop programs for mobile devices). Java downloads has specifications that allow the download and distribution of only java content An example of J2ME download descriptor is as follows:

Name—The name of the MIDlet; MIDlets are applications designed to run on wireless Java enabled devices Version—The version number of the MIDlet Description—The description of the MIDlet suite JAR-URL—The URL from which the JAR file can be loaded JAR-Size—The number of bytes in the JAR file Data Size—The minimum number of bytes of persistent data required by the MIDlet.

Further, SIM application toolkit 402 provides an interface to the user for reading, forwarding, downloading and deleting download descriptor The download descriptor stored in virtual vault 404 can be invoked at any point of time for the actual downloading, forwarding the descriptor to other mobile users, reading the information relating to the download descriptor, and deleting the download descriptor. The process of downloading involves automatic invocation of the browser for downloading of the content. As described earlier, automatic invocation of the browser is done through logic contained in SIM Application Toolkit 402. The download is then stored in the memory of the mobile device. Before a download, download server 302 will prompt the mobile user for the payment of the licensing fee for the download. If a mobile user forwards the download descriptor to a second mobile user, the information about the download content along with an identifier (such as identification name or identification number) for the second mobile user will be sent to download server 302 of mobile service provider 102. Download server 302 will check the preference and permissions of the addressed mobile user as described earlier. If the preferences of the addressed mobile user stored on repository 304 permits, then the download descriptor will be forwarded to the addressed (second) mobile user.

Download server 302 intermediates for payment and licensing as per the revenue sharing agreement between content providers and mobile service provider 102. The user is prompted for payment and Digital rights object (which is explained below) is pushed to the mobile user. If mobile user wants to delete the download descriptor, the delete function will delete the entry from the SIM database. SIM application toolkit 402 also provides for the modification prompt. The modification prompt will inform the mobile users, in case a download descriptor stored in the SIM database using virtual vault 404 is modified. Download server 302 updates virtual vault 404 in case the content provided by content provider changes or if the service for the same is withdrawn.

A Digital rights object contains the permissions for the digital content that it is associated with. For Example, a digital object containing rights for a new MP3 song can look like:

```
<rights>
    <agreement>
        <asset>
            <user id>mid:zzz@domain.com<uid>
        </asset>
        <permission>
            <play>
                <count> 1 </count>
            </play>
        </permission>
    </agreement>
</rights>
```

In the above example, the MP3 song for the user zzz@domain.com can be played only once. If the user wants to listen to it again, he/she will have to buy the content.

A preferred embodiment of the present invention supports the feature that the link can be forwarded and distributed by a mobile user to other mobile users. For instance, once a mobile user has received a URL or link, the URL can be forwarded to a second mobile user. Forwarding takes place through download server 302. The second mobile user can download the content only if the first mobile user accepts the licensing and payment requirements. Licensing is done to prevent the downloaded content from being illegally forwarded by one mobile user to another mobile user. This concept is explained more clearly in conjunction with FIG. 5.

Figure 5:
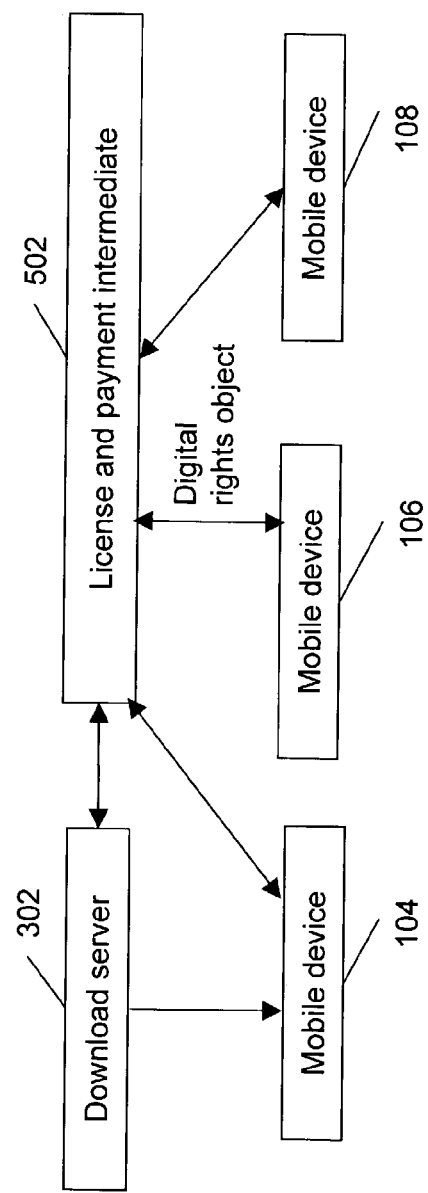
FIG. 5 is a block diagram that illustrates the licensing and payment provisions of the system in accordance with a preferred embodiment of the present invention.

FIG. 5 shows a block diagram in accordance with a preferred embodiment of the present invention. In order to ensure that licensing and payment is done before some content is downloaded, download server 302 checks the preferences of a mobile user and also prompts the mobile user regarding the payment of licensing fee for the download. A mobile user may forward the download descriptor to a second mobile user. To achieve this the first mobile user sends an identifier (such as an identification number) of the second mobile user and the download descriptor information to download server 302. As shown by block 502, download server 302 intermediates for payment and licensing. The digital rights object is also pushed to the second mobile user.

As is evident from above, the present invention enables the provision of content to mobile users only upon payment of the necessary fees. Further, SIM application toolkit 402 is platform independent. Hence it can be installed on any kind of handset. For instance, SIM application toolkit 402 will work equally well on a Nokia handset as well as a Motorola handset. SIM application toolkit 402 also allows for the storage of download descriptor in virtual vault 404. Also, the invention provides for periodic updates regarding the services. For instance, suppose a mobile user sends request for downloading of a game. Mobile service provider 102 will update the mobile user regarding the newer versions of the game that are provided by the content providers. These updates will be sent to subscribed mobile users through SMS periodically While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for super-distribution of digital content among users with mobile devices without the digital content being directly transferred from user to user, the method comprising the steps of:
   a. sending an identifier of a mobile device and a description of a digital content to a mobile service provider, the identifier and the description of the digital content being sent by a first user, the mobile device belonging to a second user, wherein the first user wants to forward the digital content to the mobile device of the second user via the mobile service provider;
   b. the mobile service provider sending a download descriptor, based on the identifier of the mobile device and the description of the digital content, to the mobile device of the second user, the download descriptor being sent by the mobile service provider if the second user is authorized to receive the digital content;
   c. receiving the download descriptor on the mobile device of the second user;
   d. requesting the mobile service provider to provide the digital content, the request being made by the mobile device of the second user if the second user wants to accept the digital content;
   e. a download server of the mobile service provider intermediating the download of the digital content and prompting the second user regarding a payment as per a digital policy associated with the digital content;
   f. the download server providing the digital content to the second user in response to the payment, the digital content being provided if it is compatible with the mobile device of the second user; and
   g. storing the digital content on the mobile device of the second user.

2. The method as recited in claim 1 wherein the step of receiving the download descriptor on the mobile device of the second user comprises:
   a. providing the second user of the mobile device an option of storing the download descriptor in a virtual vault present in the mobile device;
   b. providing the second user of the mobile device an option of reading the content of the download descriptor present in the mobile device;
   c. providing the second user of the mobile device an option of forwarding the download descriptor present in the mobile device via the mobile service provider to another user; and
   d. providing the second user of the mobile device an option of deleting the download descriptor from the mobile device.

3. The method of claim 1 wherein the step of requesting the mobile service provider to provide the digital content comprises the step of downloading the digital content stored at a Uniform Resource Locator (URL) provided in the download descriptor.

4. The method as recited in claim 3 wherein the step of downloading the digital content stored at the URL provided by the download descriptor onto the mobile device comprises the steps of:
   a. invoking a browser to download the digital content; and
   b. providing the URL name as a parameter for the download.

5. The system method as recited in claim 1 wherein the download server comprises:
   a. a profiles repository for storing user profiles and preferences;
   b. a policies repository for storing licensing and payment policies determining licensing, distribution and management of service related to the provision of the digital content; and
   c. links to the digital content available for download by any user with a mobile device.

6. The method as recited in claim 1 wherein the download descriptor comprises:
   a. a name of the digital content;
   b. a version number of the digital content;
   c. a description of the digital content;
   d. a URL from which the digital content can be downloaded; and
   e. size of the digital content to be downloaded.

7. A method for super-distribution of digital content among users with mobile devices without the digital content being directly transferred from user to user, the method comprising the steps of:
   a. requesting a mobile service provider to provide details of a digital content to a first mobile device, the first mobile device belonging to a first user, the first user wanting to obtain the digital content from the mobile service provider;
   b. sending a download descriptor to the first mobile device of the first user, the download descriptor containing the details of the digital content, the download descriptor being sent to the first mobile device of the first user by a download server associated with the mobile service provider;
   c. receiving the download descriptor, the download descriptor being received by the first mobile device of the first user;
   d. requesting the mobile service provider to provide the digital content corresponding to the download descriptor, the request being made by the first user if the first user wants to accept the digital content;
   e. the download server intermediating the download of the digital content to prompt the first user regarding a payment the first user needs to make as per a digital policy associated with the digital content, the download server intermediating to prompt the first user regarding the payment;
   f. providing the digital content to the first mobile device of the first user in response to the payment, wherein the digital content is provided to the first user by the download server, the digital content being provided if it is compatible with the first mobile device of the first user;
   g. the first user sending an identifier of a second mobile device and a description of the digital content to the mobile service provider, the second mobile device belonging to a second user, wherein the first user wants to forward the digital content to the second user via the mobile service provider as the first user is not capable of forwarding the digital content directly to the second user;
   h. the download server sending the download descriptor to the second mobile device based on the identifier of the mobile device and the description of the digital content, the download descriptor being sent by the download server if the second user is authorized to receive the digital content;
   i. receiving the download descriptor by the second mobile device of the second user,
   j. the second user requesting the mobile service provider to provide the digital content, the request being made by the mobile device if the second user wants to accept the digital content;
   k. the download server intermediating the download of the digital content to prompt the second user regarding the payment the second user needs to make as per the digital policy associated with the digital content;
   l. the download server providing the digital content to the second user in response to the payment, the digital content being provided if it is compatible with the second mobile device of the second user; and storing the digital content on the second mobile device of the second user.

* * * * *